(12) United States Patent
Welborn, Jr. et al.

(10) Patent No.: US 11,816,363 B2
(45) Date of Patent: Nov. 14, 2023

(54) FILE BASED VIRTUAL DISK MANAGEMENT

(71) Applicant: International Business Machines Corporation, Armonk, NY (US)

(72) Inventors: John Henry Welborn, Jr., Cary, NC (US); Prasad Kashyap, Apex, NC (US); Kevin Kuhner, Cary, NC (US); Kenny Huang, Holly Springs, NC (US); Brian Ray Fabec, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/453,502

(22) Filed: Nov. 4, 2021

(65) Prior Publication Data

US 2023/0135096 A1 May 4, 2023

(51) Int. Cl.
*G06F 3/06* (2006.01)

(52) U.S. Cl.
CPC .......... *G06F 3/0664* (2013.01); *G06F 3/0604* (2013.01); *G06F 3/0631* (2013.01);
(Continued)

(58) Field of Classification Search
CPC ........ G05B 13/00-048; G05B 15/00-02; G05B 17/00-02; G06F 1/00-3296; G06F 3/00; G06F 3/06-0689; G06F 5/00-16; G06F 8/00-78; G06F 9/00-548; G06F 11/00-3696; G06F 12/00-16; G06F 13/00-4295; G06F 15/00-825; G06F 16/00-986; G06F 17/00-40; G06F 21/00-88; G06F 2009/3883; G06F 2009/45562-45595; G06F 2015/761-768; G06F 2201/00-885; G06F 2206/00-20; G06F 2209/00-549; G06F 2211/00-902; G06F 2212/00-7211; G06F 2213/00-4004; G06F 2216/00-17; G06F 2221/00-2153; G06K 9/00-6298;
(Continued)

(56) References Cited

U.S. PATENT DOCUMENTS

| | | | | |
|---|---|---|---|---|
| 5,787,491 A | * | 7/1998 | Merkin et al. | G06F 9/4406 711/173 |
| 6,044,442 A | * | 3/2000 | Jesionowski | G11B 27/002 711/147 |

(Continued)

FOREIGN PATENT DOCUMENTS

| | | |
|---|---|---|
| CN | 107092441 A | 8/2017 |
| CN | 113504872 A | 10/2021 |

(Continued)

OTHER PUBLICATIONS

Lim et al., "Optimizing Nested Virtualization Performance Using Direct Virtual Hardware," Proceedings of the Twenty-Fifth International Conference on Architectural Support for Programming Languages and Operating Systems, Mar. 16-20, 2020, Lausanne, Switzerland, pp. 557-574.

(Continued)

*Primary Examiner* — Daniel C. Chappell
(74) *Attorney, Agent, or Firm* — Yee & Associates, P.C.

(57) ABSTRACT

A computer implemented method manages virtual disks. A number of processor units detects attachment of a storage to a host operating system. The number of processor units mounts the storage to a set of mount points. The number of processor units creates a set of virtual disks and assigning, by the number of processor units, the set of virtual disks to a guest in operation in which instructions for the operation are performed without interruption. According to other illustrative embodiments, a computer system and a computer program product for managing virtual disks are provided.

16 Claims, 11 Drawing Sheets

(52) U.S. Cl.
CPC .................................. *G06F 3/0644* (2013.01);
*G06F 3/067* (2013.01)

(58) Field of Classification Search
CPC ......... G06N 3/00-126; G06N 5/00-048; G06N
7/00-08; G06N 10/00; G06N 20/00-20; G06N
99/00-007; G06T 1/00-60; G06V 30/00-43;
G11B 20/00-24; G11B 33/00-1493; G11C
11/00-5692; G11C 13/00-06; G11C 14/00-009;
G11C 15/00-06; G11C 16/00-3495; G11C
17/00-18; G11C 2207/00-229; G11C
2216/00-30; H01L 25/00-50; H01L
27/00-3293; H01L 2225/00-1094; H03M
7/00-707; H04L 9/00-38; H04L 12/00-66;
H04L 41/00-5096; H04L 49/00-9094; H04L
61/00-59; H04L 67/00-75
See application file for complete search history.

(56) References Cited

U.S. PATENT DOCUMENTS

| | | | | |
|---|---|---|---|---|
| 7,000,088 | B1* | 2/2006 | Rudeseal et al. ..... | G06F 3/0683 710/36 |
| 7,284,109 | B1* | 10/2007 | Paxie et al. ............ | G06F 16/10 711/173 |
| 7,290,168 | B1* | 10/2007 | DeKoning ............. | H04L 45/24 714/5.11 |
| 7,356,679 | B1* | 4/2008 | Le et al. ................ | G06F 16/116 713/1 |
| 7,500,082 | B2* | 3/2009 | Kumar ................. | G06F 3/0674 702/182 |
| 8,209,680 | B1* | 6/2012 | Le et al. ................ | G06F 16/188 713/1 |
| 8,621,178 | B1* | 12/2013 | Lazar ................... | G06F 3/0689 711/163 |
| 9,146,765 | B2 | 9/2015 | Starks et al. | |
| 11,016,798 | B2 | 5/2021 | Gopalan | |
| 2001/0048121 | A1* | 12/2001 | Mizushima et al. . | G11C 16/349 711/E12.008 |
| 2003/0115434 | A1* | 6/2003 | Mahalingam et al. | G06F 3/0643 711/112 |
| 2004/0117610 | A1* | 6/2004 | Hensley ................ | G06F 21/57 713/2 |
| 2005/0091454 | A1* | 4/2005 | Shimada et al. ....... | G06F 3/067 711/173 |
| 2005/0228950 | A1* | 10/2005 | Karr .................... | G06F 3/0664 711/170 |
| 2006/0259683 | A1* | 11/2006 | Bridge, Jr. ............. | G06F 3/064 711/112 |
| 2007/0168478 | A1* | 7/2007 | Crosbie et al. .......... | G06F 8/63 709/221 |
| 2009/0007105 | A1* | 1/2009 | Fries et al. ............... | G06F 8/65 718/1 |
| 2009/0235358 | A1* | 9/2009 | Tolba .................. | G06F 3/0676 718/1 |
| 2011/0035358 | A1* | 2/2011 | Naik ..................... | G06F 16/10 718/1 |
| 2011/0047195 | A1* | 2/2011 | Le et al. .............. | G06F 16/188 707/827 |
| 2012/0233434 | A1* | 9/2012 | Starks et al. ......... | G06F 3/0664 711/170 |
| 2014/0013051 | A1* | 1/2014 | Qian ................... | G06F 3/0607 711/115 |
| 2015/0012570 | A1* | 1/2015 | Le et al. ............. | G06F 9/45558 707/823 |
| 2015/0095600 | A1* | 4/2015 | Bahnsen et al. ....... | G06F 9/466 711/163 |
| 2016/0224572 | A1* | 8/2016 | Le et al. ................ | G06F 16/10 |
| 2017/0090774 | A1 | 3/2017 | Jayaraman et al. | |
| 2018/0136870 | A1 | 5/2018 | Rajani et al. | |
| 2019/0188025 | A1 | 6/2019 | Anderson et al. | |
| 2021/0174411 | A1 | 6/2021 | Van Biljon et al. | |

FOREIGN PATENT DOCUMENTS

GB          2499942 B          9/2019

OTHER PUBLICATIONS

Mell et al., "The NIST Definition of Cloud Computing", Computer Security Division, National Institute of Standards and Technology, Jan. 2011, 7 pages.

Nelson, "Auto-Detecting and Attaching Block Storage Service Volumes," Oracle Cloud Infrastructure Blog, Jun. 27, 2017, accessed Nov. 3, 2021, 4 pages. https://blogs.oracle.com/cloud-infrastructure/post/auto-detecting-and-attaching-block-storage-service-volumes.

PCT International Search Report and Written Opinion, dated Jan. 20, 2023, regarding Application No. PCT/CN2022/128933, 9 pages.

William K. Josephson, Lars A. Bongo, David Flynn, and Kai Li. 2010. DFS: a file system for virtualized flash storage. In Proceedings of the 8th Usenix conference on File and storage technologies (Fast'10). USENIX Association, USA, 7. (Year: 2010).*

Y. Okamoto, K. Arai, T. Kobayashi, T. Fujihashi, T. Watanabe and S. Saruwatari, "A NAS Integrated File System for On-site IoT Data Storage," 2020 IEEE International Conference on Pervasive Computing and Communications Workshops (PerCom Workshops), Austin, TX, USA, 2020, pp. 1-7 (Year: 2020).*

* cited by examiner

FILE BASED VIRTUAL DISK MANAGEMENT

BACKGROUND

1. Field

The disclosure relates generally to an improved computer system and more specifically to a method, apparatus, computer system, and computer program product for managing virtual storage for virtual machines.

2. Description of the Related Art

A hypervisor can create and run virtual machines. With the use of a hypervisor, a host computer can support multiple guest virtual machines by virtually sharing resources such as memory, storage, and processors. For example, a hypervisor can provide a guest virtual machine access to a hard disk on the host computer using a disk image file. This disk image file is also referred to as a virtual disk image file.

A virtual disk is a file on the host computer that appears to be a physical disk drive to a guest operating system in a guest virtual machine. A hypervisor can attach and detach virtual disks to a guest virtual machine. When a physical storage device is removed, the hypervisor can unmount the disk image. In a similar fashion, when the physical storage is resized, virtual disk can be resized, or other operations can occur such as creating or deleting virtual disks.

SUMMARY

According to one illustrative embodiment, a computer implemented method manages virtual disks. A number of processor units detects attachment of a storage to a host operating system. The number of processor units mounts the storage to a set of mount points. The number of processor units creates a set of virtual disks and assigning, by the number of processor units, the set of virtual disks to a guest in an operation in which instructions for the operation are performed without interruption. According to other illustrative embodiments, a computer system and a computer program product for managing virtual disks are provided.

DETAILED DESCRIPTION

Figure 1:
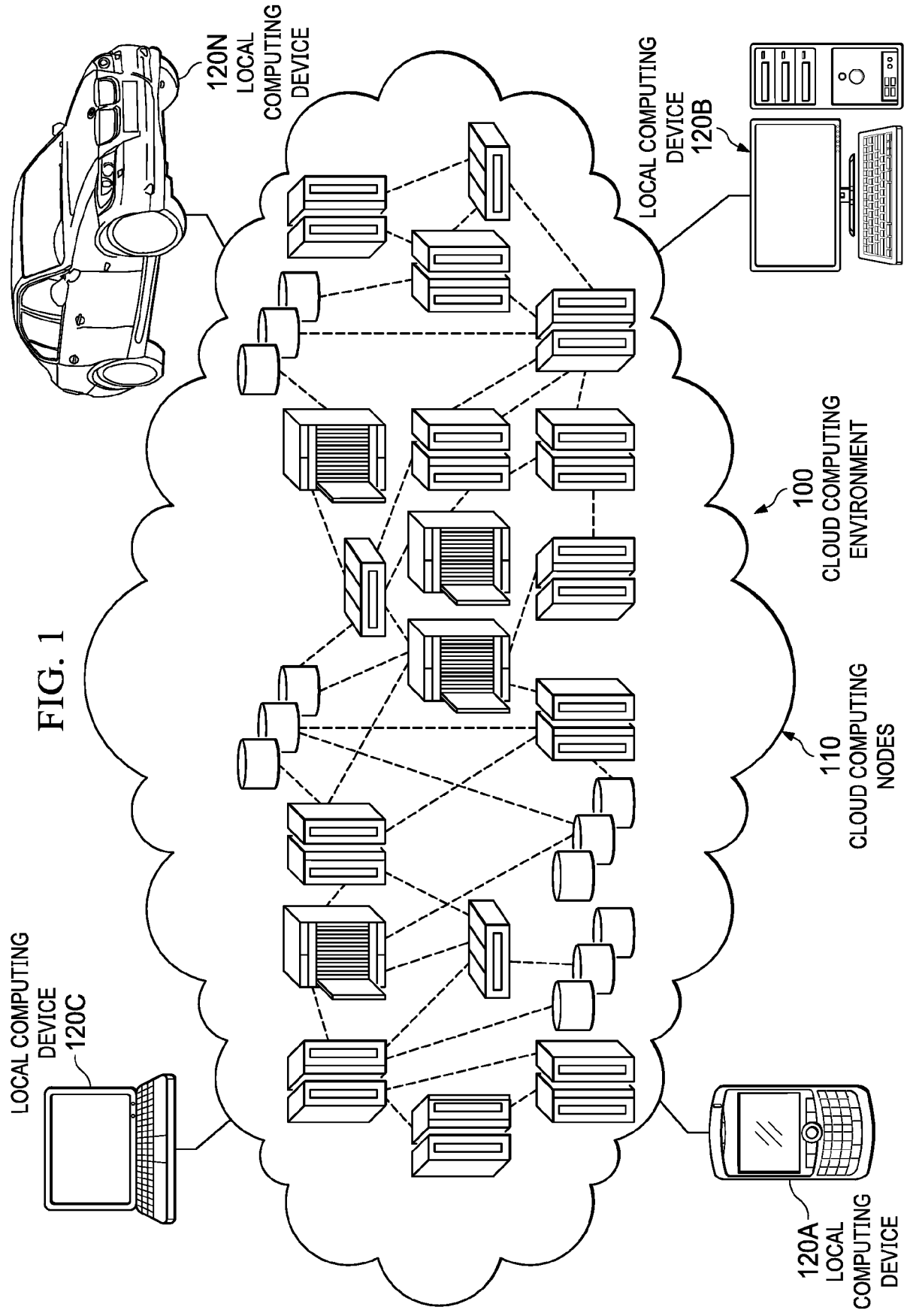
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, illustrative embodiments provide a method, apparatus, system, and computer program product for automatically encrypting sensitive data. In the illustrative embodiments, sensitive data can be obtained from a location identified in configuration information. The sensitive data can be automatically encrypted using configuration information and stored during the deployment of containers for an application. The illustrative embodiments also recognize and take into account that changes in the sensitive data can be detected in which the sensitive data can be automatically encrypted and automatically deployed for use by the containers for the application. This detection of changes to sensitive data can be detected using checksums.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
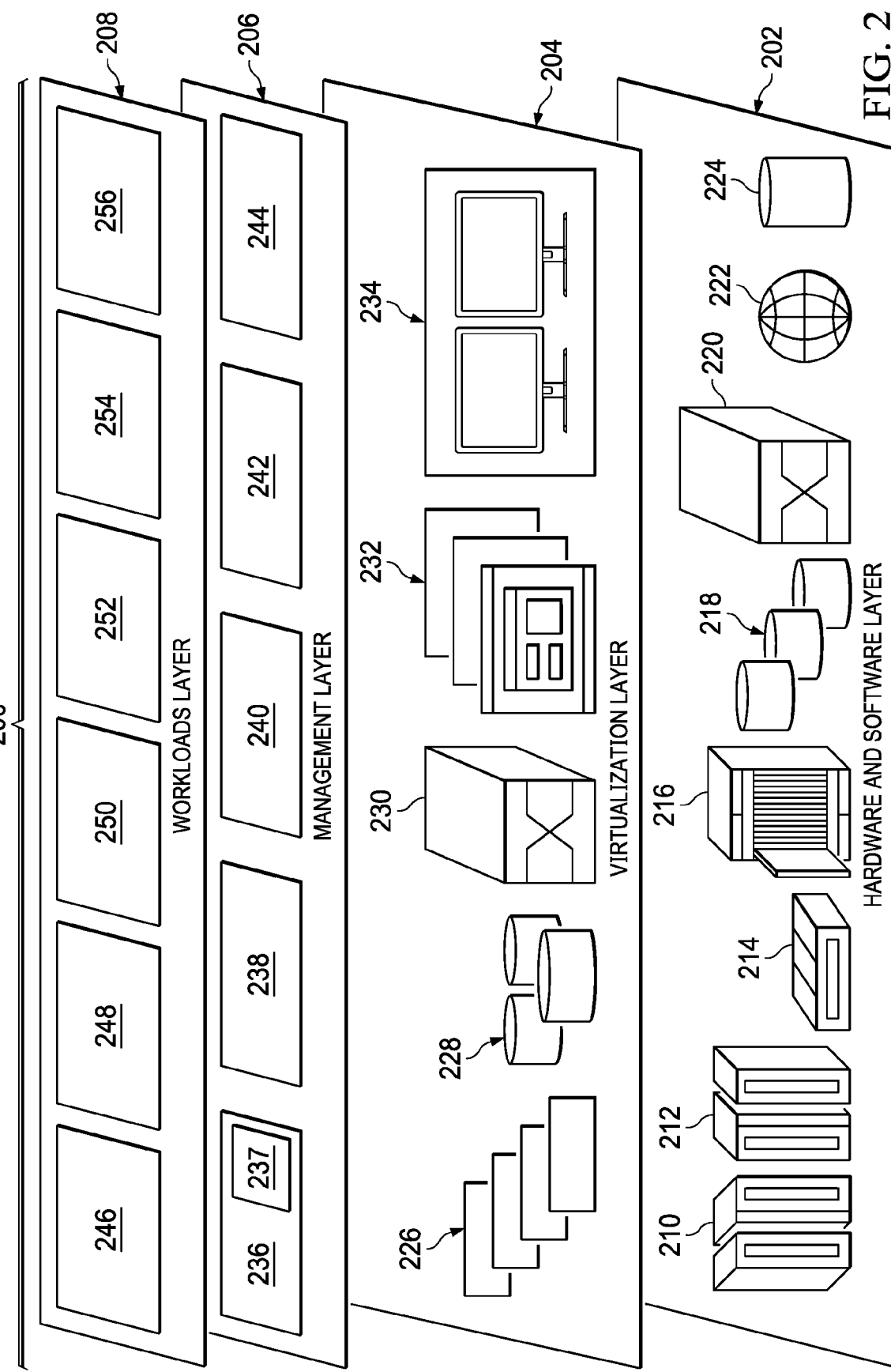
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and embodiments of the invention are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. In this illustrative example, virtual disk management 237 in resource provisioning can manage resources in the form for virtual disks.

Metering and pricing 238 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and container orchestration 256.

The illustrative embodiments recognize and take into account the number of different considerations. For example, the illustrative embodiments recognize and take into account that when a hypervisor does not provide or support pass-through or partial virtualization of storage devices, managing the lifecycle of storage devices that are available for use by nested virtualized guests can be challenging. The illustrative embodiments recognize and take into account the lifecycle attachment, detachment, and updates. The illustrative embodiments recognize and take into account that it would be desirable to automate the discovery processing of attached storage devices for use by guests running under a hypervisor. The illustrative embodiments recognize and take into account that the automation of this process can include using disk image files compatible with a hypervisor.

Figure 3:
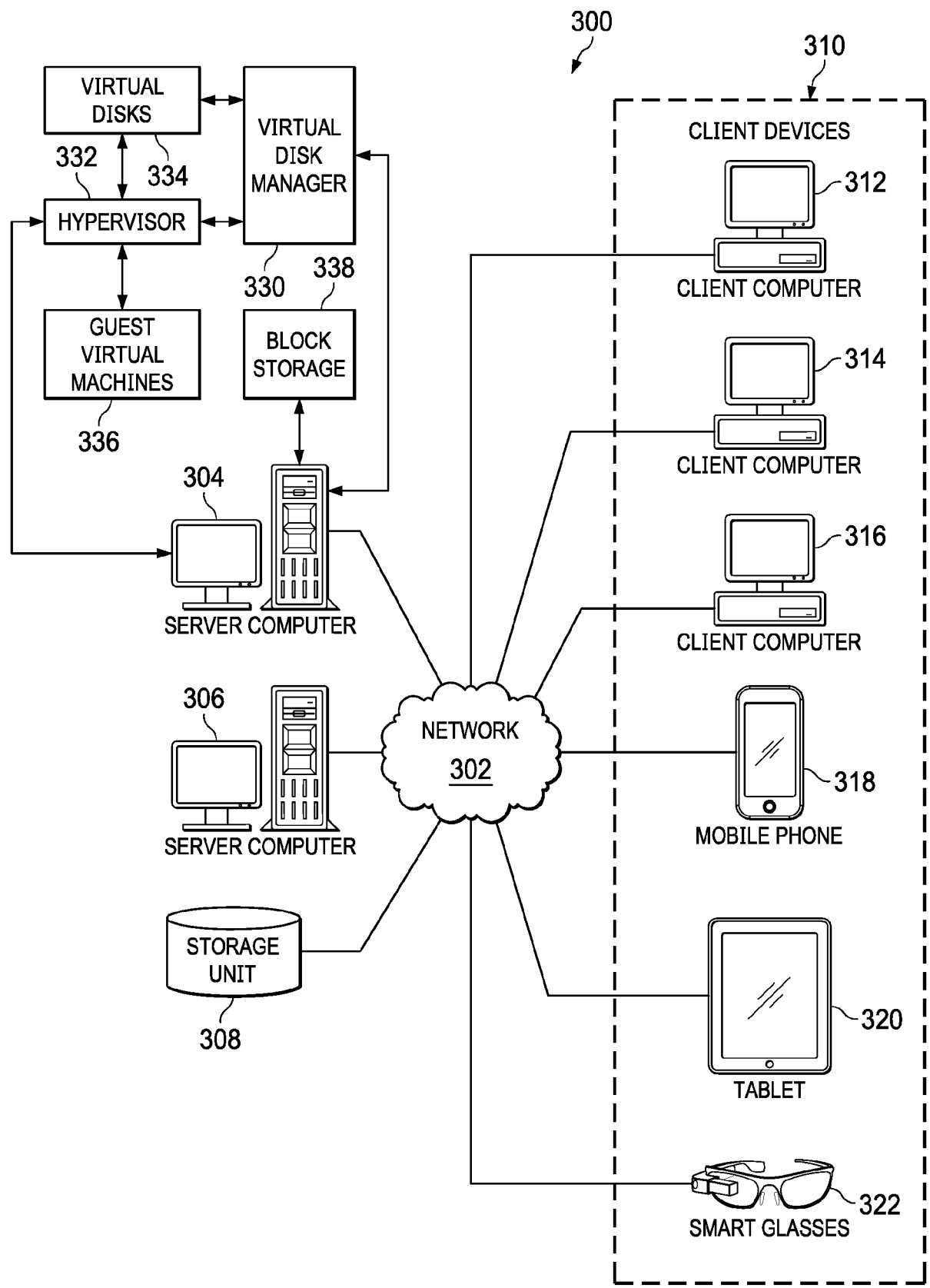
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, a virtual disk manager 330 runs on server computer 304 with hypervisor 332 to manage virtual disks 334 for guest virtual machines 336 using block storage 338. In this illustrative example, block storage 338 is a physical storage that includes one or more physical storage devices. These physical devices store data in bytes that are blocked or grouped into segments that each have their own entrance. In other examples, block storage 338 can be a virtual storage.

Virtual disk manager 330 can create and assign virtual disks 334 to guest virtual machines 336. In this illustrative example, the creation of virtual disks 334 occurs when the presence of block storage 338 is discovered. This discovery can be performed in a number of different ways. For example, the discovery of block storage 338 can be performed using event driven notifications or a query.

As depicted, hypervisor 332 attaches virtual disks 334 to guest virtual machines 336 as assigned by virtual disk manager 330. Virtual disks 334 are viewed by guest virtual machines 336 with characteristics and a format that are expected and used by guest virtual machines 336. The characteristics can include, for example, a format, a size, or capacity, or other characteristic that makes virtual disks 334 look like actual physical devices.

Virtual disk manager 330 can also operate to remove virtual disks 334 when block storage 338 is removed or becomes missing. This situation can be detected using event driven notifications or scheduled queries. Virtual disk manager 330 can notify hypervisor 332 that the virtual disks are to be removed from use by guest virtual machines 336. As another example, virtual disk manager 330 can also add, remove, or resize virtual disks 334 in response to resizing of block storage 338.

Illustration of the management of virtual disks 334 is an example of one implementation for managing virtual disks for guest virtual machines 336. In other illustrative examples, virtual disk manager 330 may manage one or more virtual disks for single guest virtual machine. In yet another illustrative example, more than one block storage can be present.

Figure 4:
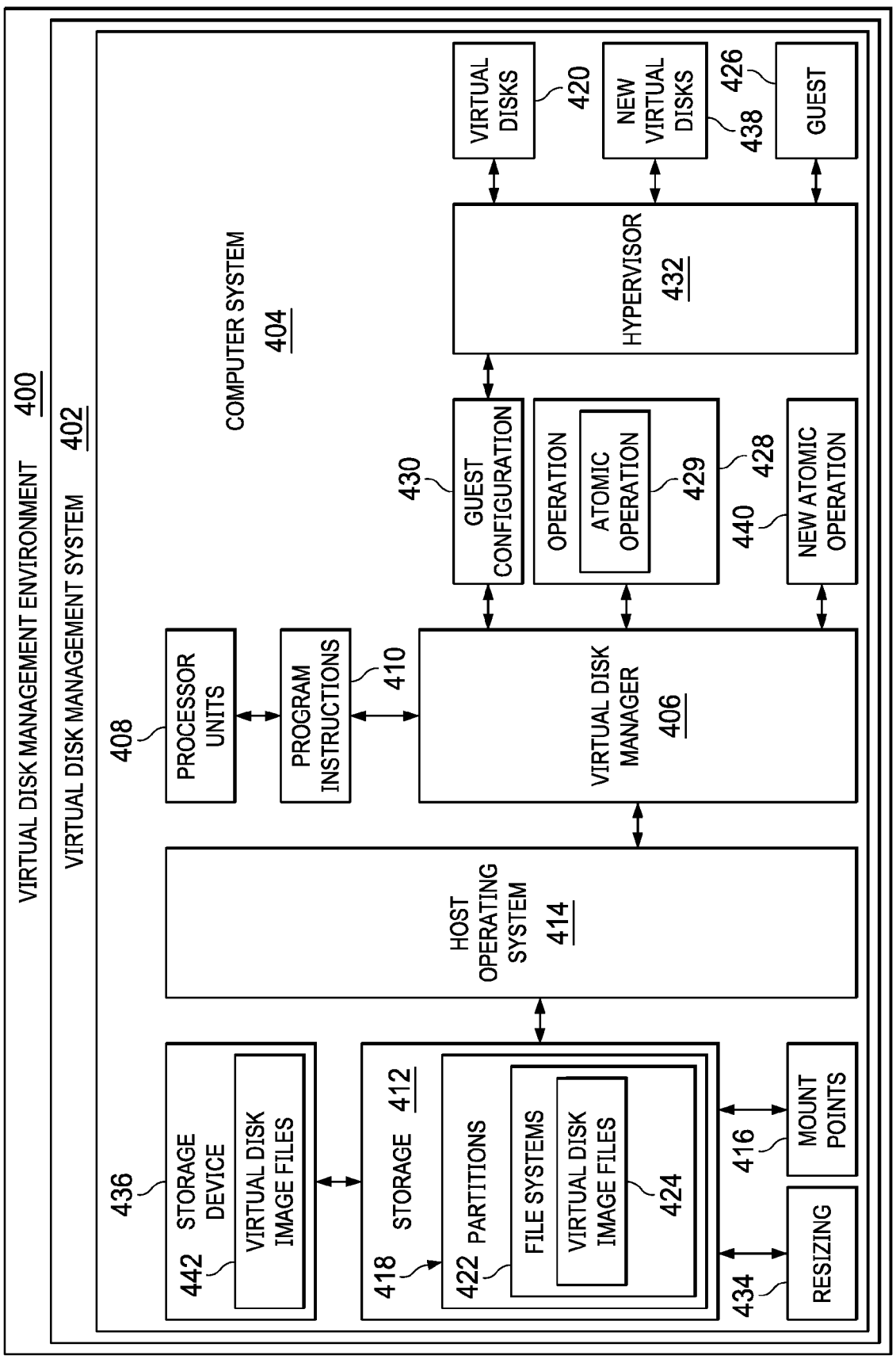
FIG. 4 is a block diagram of a virtual disk management environment in accordance with an illustrative embodiment.

With reference now to FIG. 4, a block diagram of a virtual disk management environment is depicted in accordance with an illustrative embodiment. In this illustrative example, virtual disk management environment 400 includes components that can be implemented in hardware such as the hardware shown in cloud computing environment 100 in FIG. 1 or network data processing system 300 in FIG. 3.

In this illustrative example, virtual disk management system 402 in virtual disk management environment 400 comprises a number of different components. As depicted, virtual disk management system 402 comprises computer system 404 and virtual disk manager 406. Virtual disk manager 406 is located in computer system 404.

Virtual disk manager 406 can be implemented in software, hardware, firmware or a combination thereof. When software is used, the operations performed by virtual disk manager 406 can be implemented in program instructions configured to run on hardware, such as a processor unit. When firmware is used, the operations performed by virtual disk manager 406 can be implemented in program instructions and data and stored in persistent memory to run on a processor unit. When hardware is employed, the hardware can include circuits that operate to perform the operations in virtual disk manager 406.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 404 is a physical hardware system and includes one or more data processing systems. When more than one data processing system is present in computer system 404, those data processing systems are in communication with each other using a communications medium. The communications medium can be a network. The data processing systems can be selected from at least one of a computer, a server computer, a tablet computer, or some other suitable data processing system.

As depicted, computer system 404 includes a number of processor units 408 that are capable of executing program instructions 410 implementing processes in the illustrative examples. As used herein a processor unit in the number of processor units 408 is a hardware device and is comprised of hardware circuits such as those on an integrated circuit that respond and process instructions and program code that operate a computer. When a number of processor units 408 execute program instructions 410 for a process, the number of processor units 408 is one or more processor units that can be on the same computer or on different computers. In other words, the process can be distributed between processor units on the same or different computers in a computer system. Further, the number of processor units 408 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

As depicted, virtual disk manager 406 detects attachment of storage 412 to host operating system 414. This detection can be performed using a discovery process. The discovery can be performed in a number of different ways. For example, the discovery can use event driven notifications that initiate storage device discovery or can involve using scheduled queries to initiate block storage discovery. Storage 412 can be a virtual storage. For example, storage 412 can be virtual storage in a nested virtualization system.

In this illustrative example, the storage 412 is present when storage 412 is attached to host operating system 414. Storage 412 can take a number of different forms. For example, storage 412 can use one or more storage architectures selected from at least one of a block storage, a file storage, an object storage, or some other suitable type of storage architecture. The storage devices can be a in storage 412 can be selected from at least one of a hard disk drive, a solid-state disk drive, or other suitable types of storage devices.

In response to storage 412, virtual disk manager 406 mounts storage 412 to a set of mount points 416. In this illustrative example, the set of mount points 416 are a set of locations in a set of partitions 418 for storage 412. The set of partitions 418 can be one or more partitions. Each mount point can be a directory in a file system.

Prior to mounting storage 412, virtual disk manager 406 creates a set of partitions 418 for a set of virtual disks 420. Virtual disk manager 406 also creates a set of file systems 422 in the set of partitions 418 for the set of virtual disks 420 prior to mounting storage 412. The set of file systems 422 in the set of partitions 418 is mounted to the set mount points 416 by virtual disk manager 406 to mount the storage to the set of mount points 416. In this illustrative example, a set of virtual disk image files 424 is for the set of virtual disks 420 and is located in the set of file systems 422.

Virtual disk manager 406 creates a set of virtual disks 420 and assigns the set of virtual disks 420 to guest 426 in operation 428 in which instructions for the atomic operation are performed without interruption. In this illustrative example, operation 428 is atomic operation 429. In other words, instructions for creating and assigning virtual disk 420 or performed without other intervening instructions being processed for other operations not part of the atomic operation. For example, operation 428 can create and assign the set of virtual disk 420 without interruption from other steps or operations being performed that can affect creation and assignment of the set of virtual disks 420 to guest 426.

For example, the instructions to perform steps in operation 428 are executed without instructions for other steps or operations, not part of the operation 428, executing in manner that would affect creation and assignment of the set of virtual disks 420. In another illustrative example, operation 428 can also include the attachment of the set of virtual disks 420 to guest 426. In this illustrative example, guest 426 can be selected from a group comprising an operating system, a guest operating system, a virtual machine, or some other suitable component that can be considered a guest.

The creation of the set of virtual disks 420 is performed by creating the set of virtual disk image files 424 in storage 412. Each virtual disk image file in the set of virtual disk image files 424 corresponds to a virtual disk and virtual disks 420. If a single virtual disk in the set of virtual disks 420 is present, then a single virtual disk image is present in the set of virtual disk image files 424.

The assignment of the set of virtual disks 420 to guest 426 can be made by updating guest configuration 430 for hypervisor 432 for guest 426. Hypervisor 432 can use guest configuration 430 attached the set of virtual disks 420 guest 426.

In this illustrative example, hypervisor 432 is a component that can run one or more virtual machines in which the virtual machines are referred to as guests or guest virtual machines. Hypervisor 432 can be comprised of at least one of software, firmware, or hardware. In this depicted example, guest configuration 430 is a configuration file that comprises information identifying the configuration for guest 426. For example, guest configuration 430 can describe the virtual hardware resources for guest 426 including a set of virtual disk image files 424 for a set of virtual disks 420.

In this illustrative example a partition in the set of partitions 418 can have one or more of the set of virtual disk image files 424. In other words, a partition can have more than one virtual disk. Additionally, a file system in the set of file systems 422 can also have one or more of the set of virtual disk image files 424.

Further, when more than one virtual disk image file is present in the set of virtual disk image files 424, those virtual disk image files can be for the same or different type of virtual disks. These formats can be for the type of physical disk device that guest 426 can use or expects to use.

As result, the use of atomic operation 429 provide at least one of increased accuracy or security in providing virtual disks 420 to guests. Further, the use of atomic operation 429 reduce the possibility of a man in the middle attack (MITM) and avoid having orphaned virtual disks. For example, placing the set of virtual disks 420 in a pool or waiting to assign the set of virtual disks 420 at a later time, can result in a different guest other than guest 426 being attached to the set of virtual disks 420.

In addition to creating and assigning a set of virtual disks 420 to guest 426, virtual disk manager 406 can also perform other operations in managing the set of virtual disks 420. For example, virtual disk manager 406 can detect resizing 434 of storage 412. In response to detecting resizing 434, virtual disk manager 406 can update guest configuration 430 for guest 426 to reflect resizing 434 of the set of virtual disks 420.

In one illustrative example, virtual disk manager 406 detects resizing 434 of storage 412 in which resizing 434 adds a storage device 436 to storage 412. In this instance, virtual disk manager 406 creates a new set of virtual disks 438 for storage device 436 and assigns the new set of virtual disks 438 to guest 426 in a new atomic operation 440 in which the instructions for the new atomic operation 440 are performed without interruption.

In another illustrative example, virtual disk manager 406 detects resizing 434 of storage 412 in which resizing 434 removes storage device 436 from storage 412. In response to resizing 434, virtual disk manager 406 removes a number of virtual disks 420 having a number of virtual disk image files 442 located in storage device 436. Virtual disk manager 406 also unmounts a set of partitions 418 for storage 412 that correspond to storage device 436.

In yet another illustrative example, virtual disk manager 406 detects a detachment of storage 412. In this illustrative example, a detachment of storage 412 means that an event has been detected in which storage 412 has been removed, is missing, or is otherwise inaccessible. Virtual disk manager 406 updates guest configuration 430 for guest 426 to remove the set of virtual disks 420 in response to detecting a detachment of storage 412. In this case, virtual disk manager 406 unmounts storage 412 from the set of mount points 416.

Computer system 404 can be configured to perform at least one of the steps, operations, or actions described in the different illustrative examples using software, hardware, firmware or a combination thereof. As a result, computer system 404 operates as a special purpose computer system in which virtual disk manager 406 is in computer system 404 enables managing virtual disks in the virtual disks are not orphaned or exposed prior to being attached to a guest. In particular, virtual disk manager 406 transforms computer system 404 into a special purpose computer system as compared to currently available general computer systems that do not have virtual disk manager 406.

In the illustrative example, the use of virtual disk manager 406 in computer system 404 integrates processes into a practical application for managing virtual disks that increases the performance of computer system 404. In other words, virtual disk manager 406 in computer system 404 is directed to a practical application of processes managing virtual disks in virtual disk manager 406 in computer system 404 that includes creating and assigning a virtual disk to a guest in a manner that does not leave the virtual disk exposed or a pool where the virtual disk may be used for other purposes other than attachment to the guest. In this illustrative example, virtual disk manager 406 in computer system 404 in which the creation an assignment of a virtual disk is performed using an atomic operation in which other operations that may involve the virtual disk do not occur intervene between the creating and assigning of the virtual disk.

In this manner, virtual disk manager 406 in computer system 404 provides a practical application of invention method such that the functioning of computer system 404 is improved. In one or more of the different illustrative examples, when storage devices are attached, a process of disk (physical/virtual) preparation occurs in which a virtual disk image file is created and mounted via a hypervisor to be utilized by a guest. When a storage device is detached, a process of unmounting the disk image file via the hypervisor occurs, including any additional cleanup on the host operating system. When storage devices are resized, a virtual disk can be either resized accordingly by resizing the virtual disk image file or managed via creation or deletion of virtual disks by creating or deleting virtual disk image files.

The illustration of virtual disk management environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, virtual disk manager 406 can operate to manage virtual disks for one or more hypervisors in addition to or in place of hypervisor 432. As another illustrative example, one or more guests may be present in addition to guest 426 that are provided virtual disks by virtual disk manager 406 through hypervisor 432. In another illustrative example, virtual disk manager 406 can be part of the storage controller that is currently used to manage access storage 412.

Figure 5:
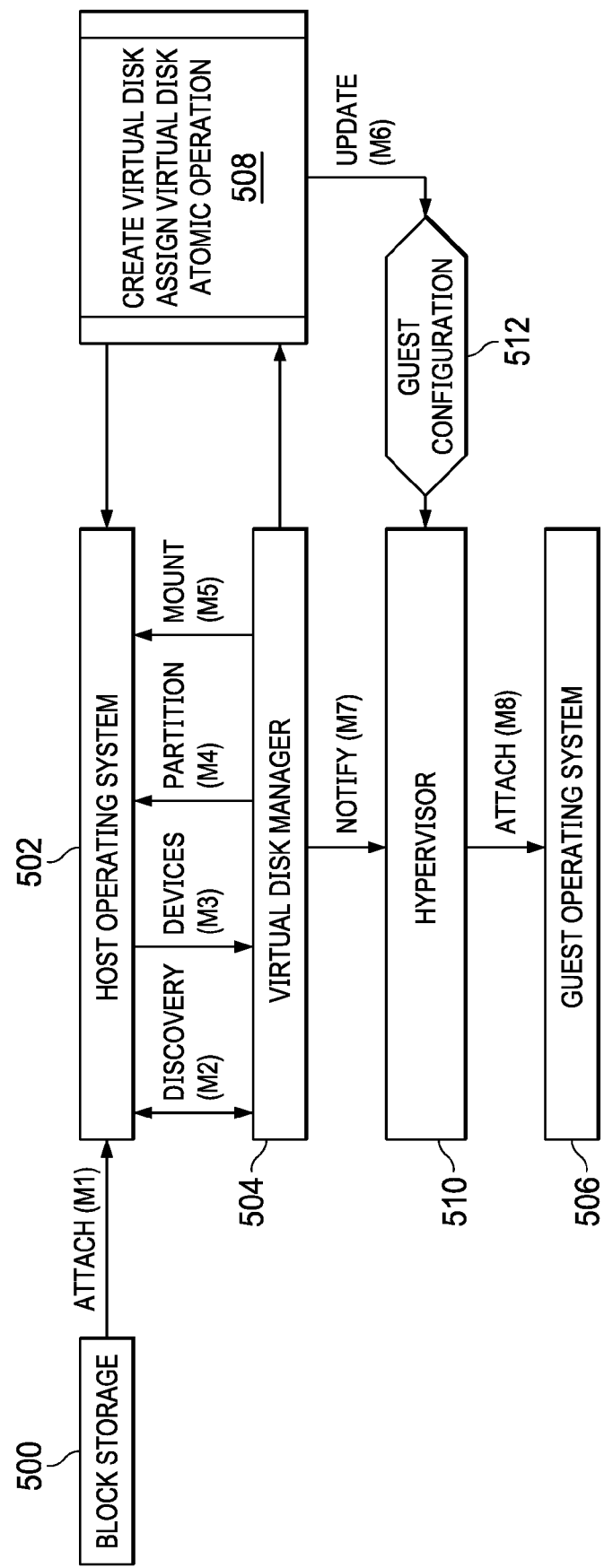
FIG. 5 is a message flow diagram illustrating attaching a virtual disk to a guest operating system in accordance with an illustrative embodiment.
Figure 6:
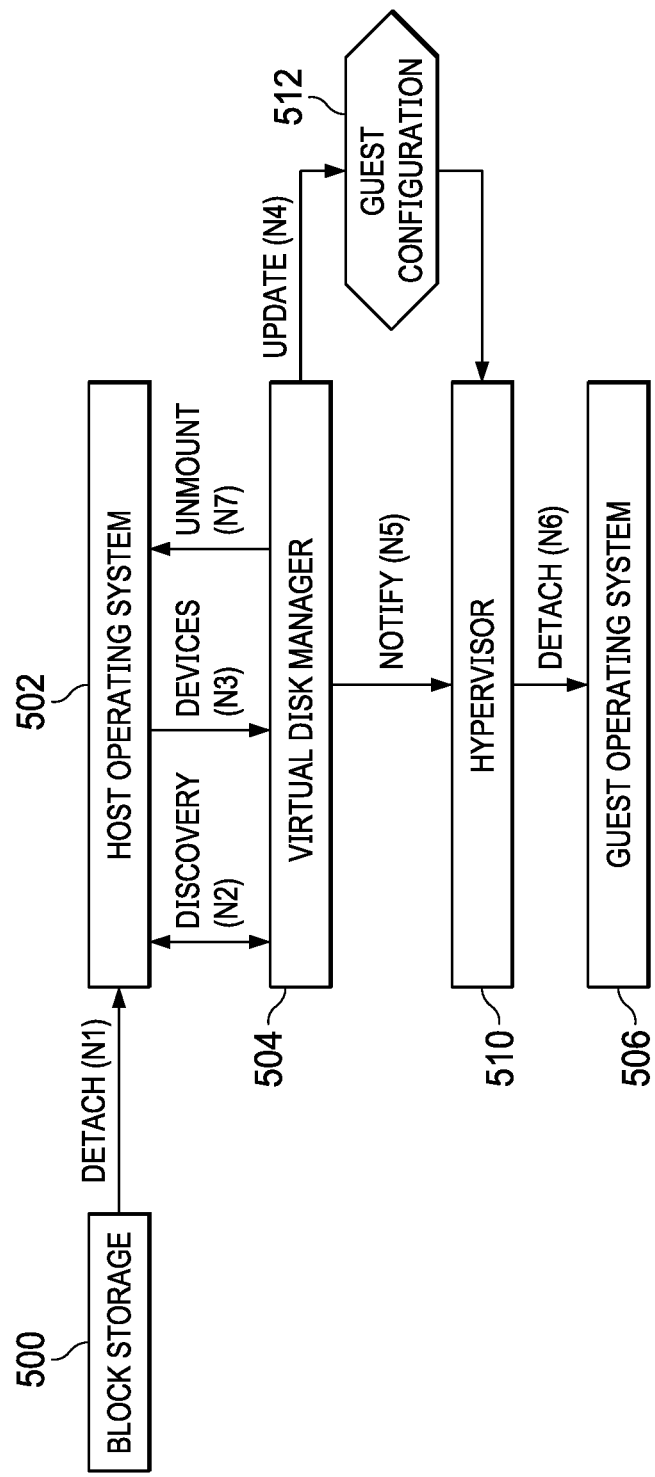
FIG. 6 is a message flow diagram illustrating removing virtual disks from the guest operating system in accordance with an illustrative embodiment.
Figure 7:
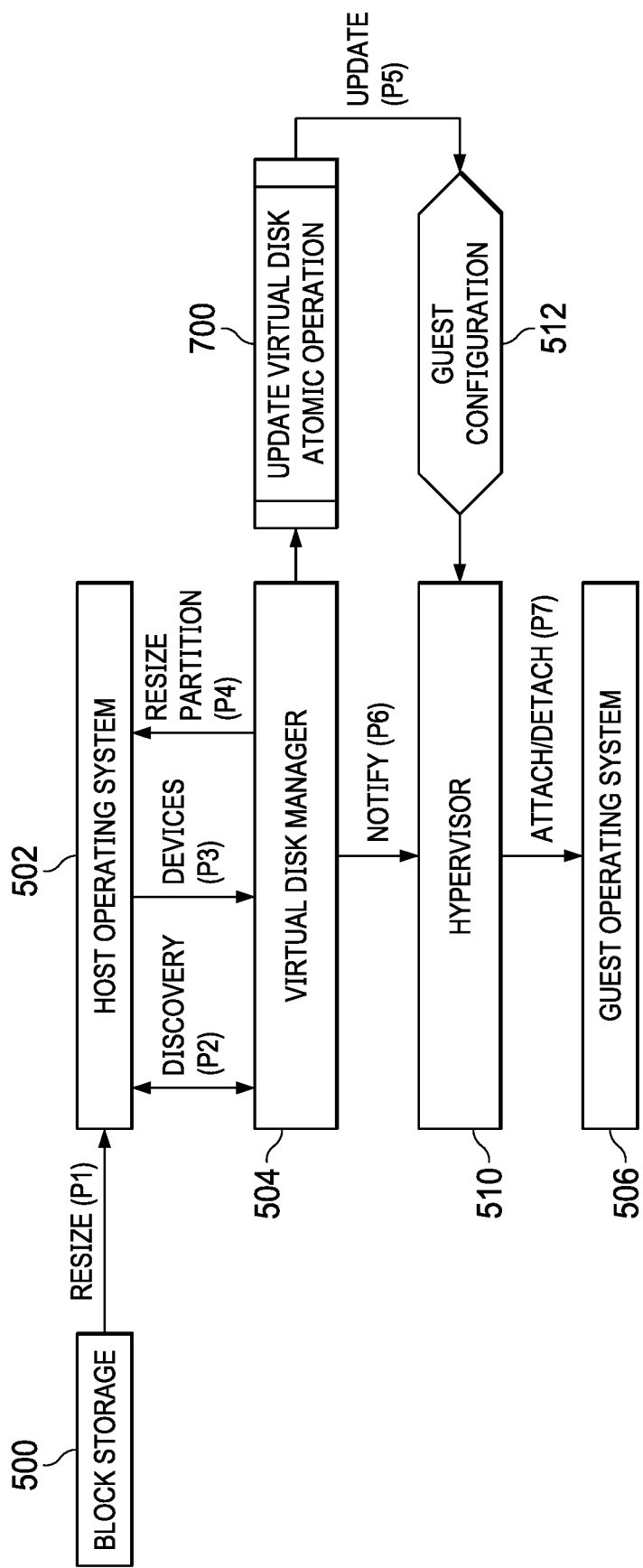
FIG. 7 is a message flow diagram for resizing a virtual disk for a guest operating system in accordance with an illustrative embodiment.

FIGS. 5-7 are message flow diagrams that illustrate in managing a virtual disk for guest operating system. In the illustrative examples, the messages can be at least one of data, and extraction, a command, and an electrical signal, or other suitable type of signal that can be used for messaging.

Turning first to FIG. 5, a message flow diagram illustrating attaching a virtual disk to a guest operating system is depicted in accordance with an illustrative embodiment. In this depicted example, block storage 500 is an example of storage 412 shown in FIG. 4. In this illustrative example, block storage 500 attaches to host operating system 502 (message m1).

A discovery stage is present in which event driven notifications or queries from virtual disk manager 504 to host operating system 502 can be used to initiate discovery of blocks storage 500 (message m2). With discovery initiated, virtual disk manager 504 can receive a list of block storage devices found by host operating system 502 during the discovery process performed by host operating system 502 (message m3). Virtual disk manager 504 examines the list of block storage devices received from host operating system 502 to determine whether new block storage devices are present or whether changes to block storage devices attached to host operating system 502 have occurred. In this example, the attachment of block storage 500 is identified from examining the list of blocks storage devices received from host operating system 502.

With detecting the attachment of block storage 500, virtual disk manager 504 sends a message to host operating system 502 to prepare a partition and file system for block storage 500 (message m4). This step can be omitted if block storage 500 has already been prepared to have a partition and a file system for the virtual disk.

Virtual disk manager 504 sends a message to host operating system 502 to mount the partition of the block storage to be accessible to host operating system 502 and guest operating system 506 (message m5). In the illustrative example, guest operating system 506 is an operating system running in a virtual machine. In contrast, host operating system 502 is located on a computer system and interacts with hardware. The computer system can be a physical or a virtual computer system and the hardware can be physical or virtual hardware with nested virtualization. With nested virtualization, host operating system 502 can be another hypervisor guest operating system running in a virtual machine.

In this illustrative example, virtual disk manager 504 performs atomic operation 508. In this illustrative example, atomic operation 508 comprises executing instructions to perform steps including creating a virtual disk and assigning the virtual disk to guest operating system 506. In creating the virtual disk, a virtual disk image file that is compatible or usable by hypervisor 510 is created. This creation of the virtual disk image file is the beginning of atomic operation 508. If a virtual disk image already exists within the partition and block storage 500, this step in atomic operation 508 can be omitted.

In assigning the virtual disk to guest operating system 506, atomic operation 508 updates guest configuration 512. This update is performed to include the new virtual disk image for the virtual disk for use by guest operating system 506 (message m6). In other words, updating of guest configuration 512 is part of atomic operation 508. Thus, the steps of creating and assigning the virtual disk in atomic operation 508 can be performed without interruption by other steps for processes, threads, programs, or other types of execution units that may potentially assign or attach the virtual disk to a guest other than the intended guest, guest operating system 506.

Virtual disk manager 504 can notify hypervisor 510 that guest configuration 512 has been updated (message m7). This notification may be unnecessary if automatic discovery is not performed by hypervisor 510.

This update to guest configuration 512 is used by hypervisor 510 to attach the virtual disk (message m8). Guest operating system 506 can now use the virtual disk.

With reference to FIG. 6, a message flow diagram illustrating removing virtual disks from the guest operating system is depicted in accordance with an illustrative embodiment. In this depicted example, block storage 500 detaches from host operating system 502 (message n1). The detection of this detachment can be performed through event driven notifications or virtual disk manager 504 initiating the discovery using a query (message n2). In this discovery process, host operating system 502 returns a list of devices to virtual disk manager 504 (message n3). Virtual disk manager 504 can analyze the list of devices to determine that block storage 500 has been detached.

In response to detecting the detachment of block storage 500, virtual disk manager 504 updates guest configuration 512 to remove the virtual disk image for the virtual disk used by guest operating system 506 (message n4). Virtual disk manager 504 notifies hypervisor 510 of the update to guest configuration 512 (message n5). Hypervisor 510 can then detach guest operating system 506 (message n6).

Virtual disk manager 504 can send a message to host operating system 502 unmount the partition that was in block storage 500 in response to detecting the detachment of block storage 500 (message n7).

With reference next to FIG. 7, a message flow diagram for resizing a virtual disk for a guest operating system is depicted in accordance with an illustrative embodiment. In this depicted example, block storage 500 is resized and a resized message being sent to host operating system 502 (message p1).

The detection of this resizing can be performed through event driven notifications or virtual disk manager 504 initiating the discovery using a query (message p2). In this discovery process, host operating system 502 returns a list of devices to virtual disk manager 504 (message p3). Virtual disk manager 504 can analyze the list of devices to determine that block storage 500 has been resized.

Virtual disk manager 504 causes host operating system 502 to resize the partition to the new size (message p4). If the resizing of the partition shrinks block storage 500, one or more virtual disks can be removed to reduce the space available to guest operating system 506. The removal of one or more virtual disks from use by guest operating system 506 can be performed by updating guest configuration 512 to remove virtual disk image files (message p5).

If the resizing of partition increases the amount of space the partition, virtual disk manager 504 performs atomic operation 700 to create one or more virtual disks for the increased space resulting from resizing block storage 500 and assign one or more virtual disks to guest operating system 506. The creation of one or more virtual disk image files for one or more virtual disks is the beginning step for atomic operation 700. The assignment of the virtual disk can be reflected by updating guest configuration 512 to include a virtual disk image for each virtual disk being assigned to guest operating system 506 (message p5). This updating of guest configuration 512 is the second step in atomic operation 700 in this example. As depicted, these two steps are performed without interruption by steps for processes, threads, programs, or other types of execution units that may potentially assign or attach the virtual disk to a guest other than the intended guest, guest operating system 506.

In either case, virtual disk manager 504 notifies hypervisor 510 of the update to guest configuration 512 (message p6). Hypervisor 510 can attach or detach virtual disks from guest operating system 506 based on the addition or removal of virtual disk image files from guest configuration 512 (message p7).

The use of atomic operation 508 in FIG. 5 and atomic operation 700 in FIG. 7, provides improved resource management over current techniques that place virtual disks into pools or allow virtual disks to remain unattached for some period of time. The use of atomic operations can ensure that orphan virtual disks are not present that can potentially be subject to a man in the middle attack (MITM), eavesdropping, or attachment to another guest operating system. Additionally, the use of atomic operations can also cause attachments of the entire block storage device eliminating orphaned wasted space that may remain unused.

Figure 8:
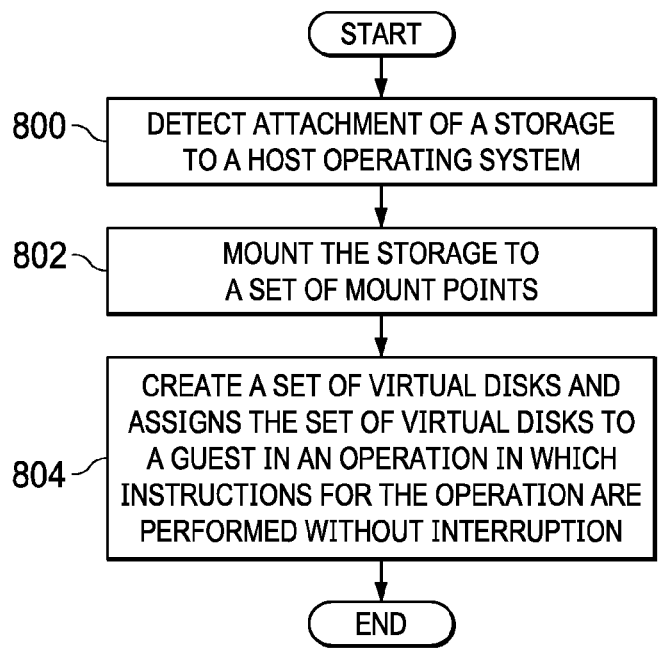
FIG. 8 is a flowchart of a process for managing virtual disks in accordance with an illustrative embodiment.

Turning next to FIG. 8, a flowchart of a process for managing virtual disks is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. For example, the process can be implemented in virtual disk manager 406 in computer system 404 in FIG. 4.

The process begins by detecting an attachment of storage to a host operating system (step 800). The process mounts the storage to a set of mount points (step 802).

The process creates a set of virtual disks and assigns the set of virtual disks to a guest in an operation in which instructions for the operation are performed without interruption (step 804). The process terminates thereafter.

Figure 9:
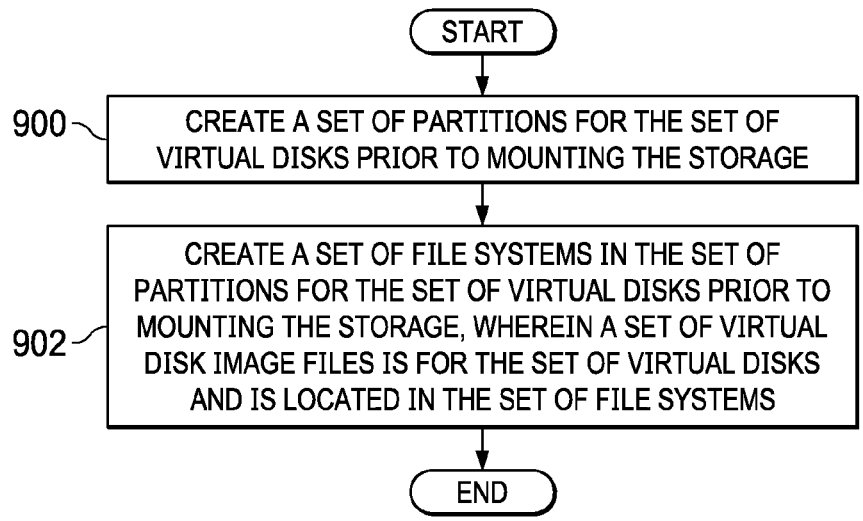
FIG. 9 is a flowchart of a process for managing virtual disks in accordance with an illustrative embodiment.

With reference now to FIG. 9, a flowchart of a process for managing virtual disks is depicted in accordance with an illustrative embodiment. The steps in this flowchart are examples of additional steps that can be performed with the steps in FIG. 8.

The process creates a set of partitions for the set of virtual disks prior to mounting the storage (step 900). The process creates a set of file systems in the set of partitions for the set of virtual disks prior to mounting the storage, wherein a set of virtual disk image files is for the set of virtual disks and is located in the set of file systems (step 902). The process terminates thereafter.

Figure 10:
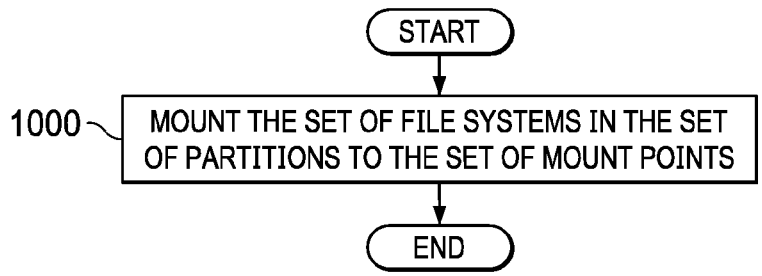
FIG. 10 is a flowchart of a process for mounting a storage in accordance with an illustrative embodiment.

Turning to FIG. 10, a flowchart of a process for mounting storage is depicted in accordance with an illustrative embodiment. This flowchart is an example of an implementation for step 802 in FIG. 8.

The process mounts the set of file systems in the set of partitions to the set of mount points (step 1000). The process terminates thereafter.

Figure 11:
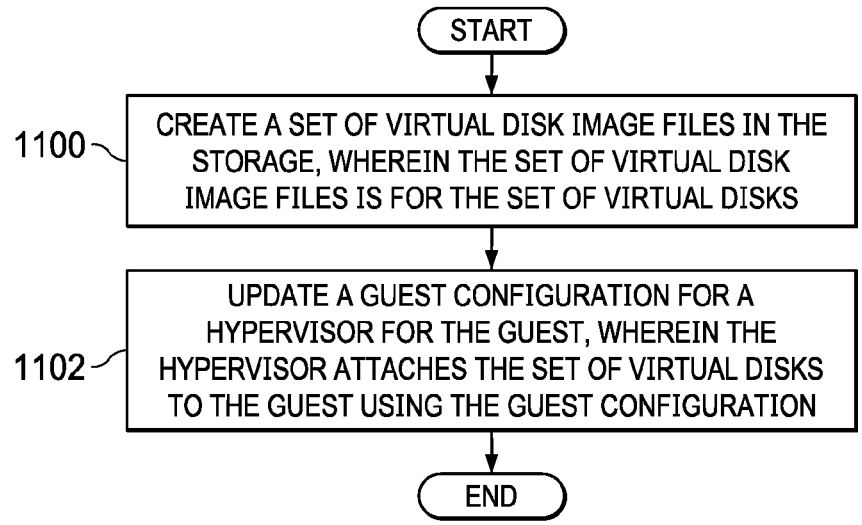
FIG. 11 is a flowchart of a process for creating and assigning virtual disks in an atomic operation in accordance with an illustrative embodiment.

In FIG. 11, a flowchart of a process for creating and assigning virtual disks in an atomic operation is depicted in accordance with an illustrative embodiment. This flowchart is an example of an implementation for step 804 in FIG. 8. The steps in this flowchart are implemented in an atomic operation so that the instructions for this atomic operation execute without interruption.

The process creates a set of virtual disk image files in the storage, wherein the set of virtual disk image files is for the set of virtual disks (step 1100). The process updates a guest configuration for a hypervisor for the guest, wherein the hypervisor attaches the set of virtual disks to the guest using the guest configuration (step 1102). The process terminates thereafter.

Figure 12:
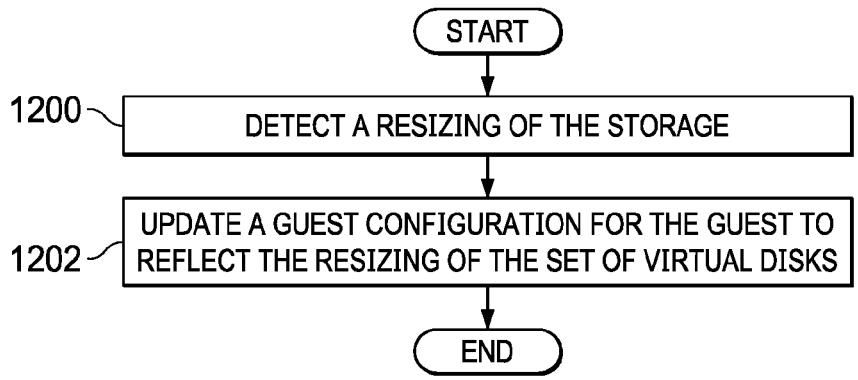
FIG. 12 is a flowchart of a process for managing virtual disks in accordance with an illustrative embodiment.

With reference to FIG. 12, a flowchart of a process for managing virtual disks is depicted in accordance with an illustrative embodiment. The steps in this flowchart are examples of additional steps that can be performed with the steps in FIG. 8.

The process detects a resizing of the storage (step 1200). The process updates a guest configuration for the guest to reflect the resizing of the set of virtual disks (step 1202). The process terminates thereafter.

Figure 13:
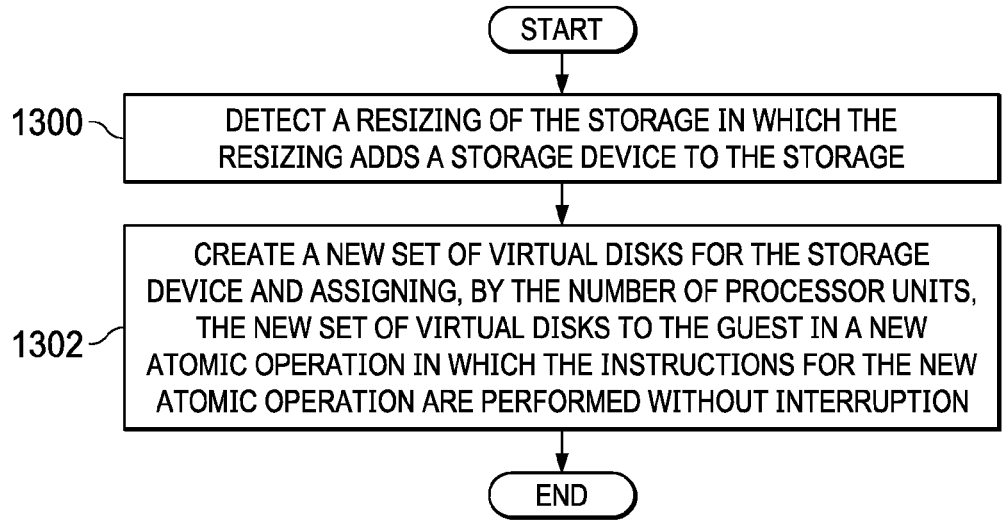
FIG. 13 is a flowchart of a process for managing virtual disks in accordance with an illustrative embodiment.

Turning to FIG. 13, a flowchart of a process for managing virtual disks is depicted in accordance with an illustrative embodiment. The steps in this flowchart are examples of additional steps that can be performed with the steps in FIG. 8.

The process detects a resizing of the storage in which the resizing adds a storage device to the storage (step 1300). The process creates a new set of virtual disks for the storage device and assigning, by the number of processor units, the new set of virtual disks to the guest in a new atomic operation in which the instructions for the new atomic operation are performed without interruption (step 1302). The process terminates thereafter.

Figure 14:
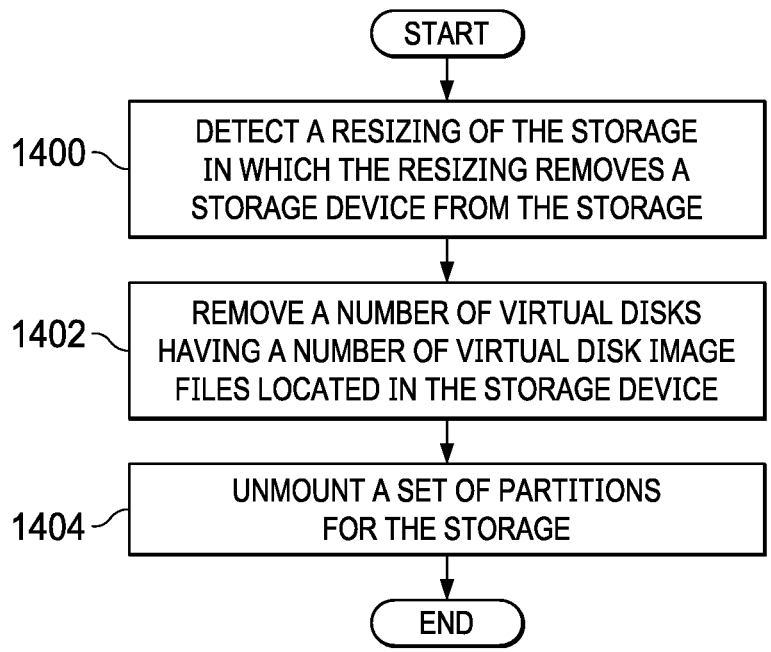
FIG. 14, a flowchart of a process for managing virtual disks in accordance with an illustrative embodiment.

With reference now to FIG. 14, a flowchart of a process for managing virtual disks is depicted in accordance with an illustrative embodiment. The steps in this flowchart are examples of additional steps that can be performed with the steps in FIG. 8.

The process detects a resizing of the storage in which the resizing removes a storage device from the storage (step 1400). The process removes number of virtual disks having a number of virtual disk image files located in the storage device (step 1402).

The process unmounts a set of partitions for the storage (step 1404). The process terminates thereafter.

Figure 15:
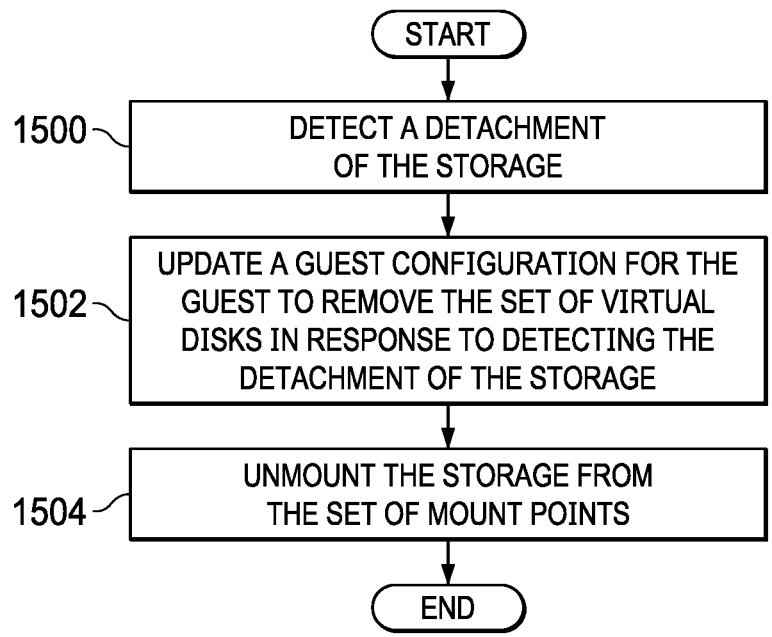
FIG. 15 is a flowchart of a process for managing virtual disks in accordance with an illustrative embodiment.

In FIG. 15, a flowchart of a process for managing virtual disks is depicted in accordance with an illustrative embodiment. The steps in this flowchart are examples of additional steps that can be performed with the steps in FIG. 8.

The process detects a detachment of the storage (step 1500). The process updates a guest configuration for the guest to remove the set of virtual disks in response to detecting the detachment of the storage (step 1502).

The process unmounts the storage from the set of mount points (step 1504). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 16:
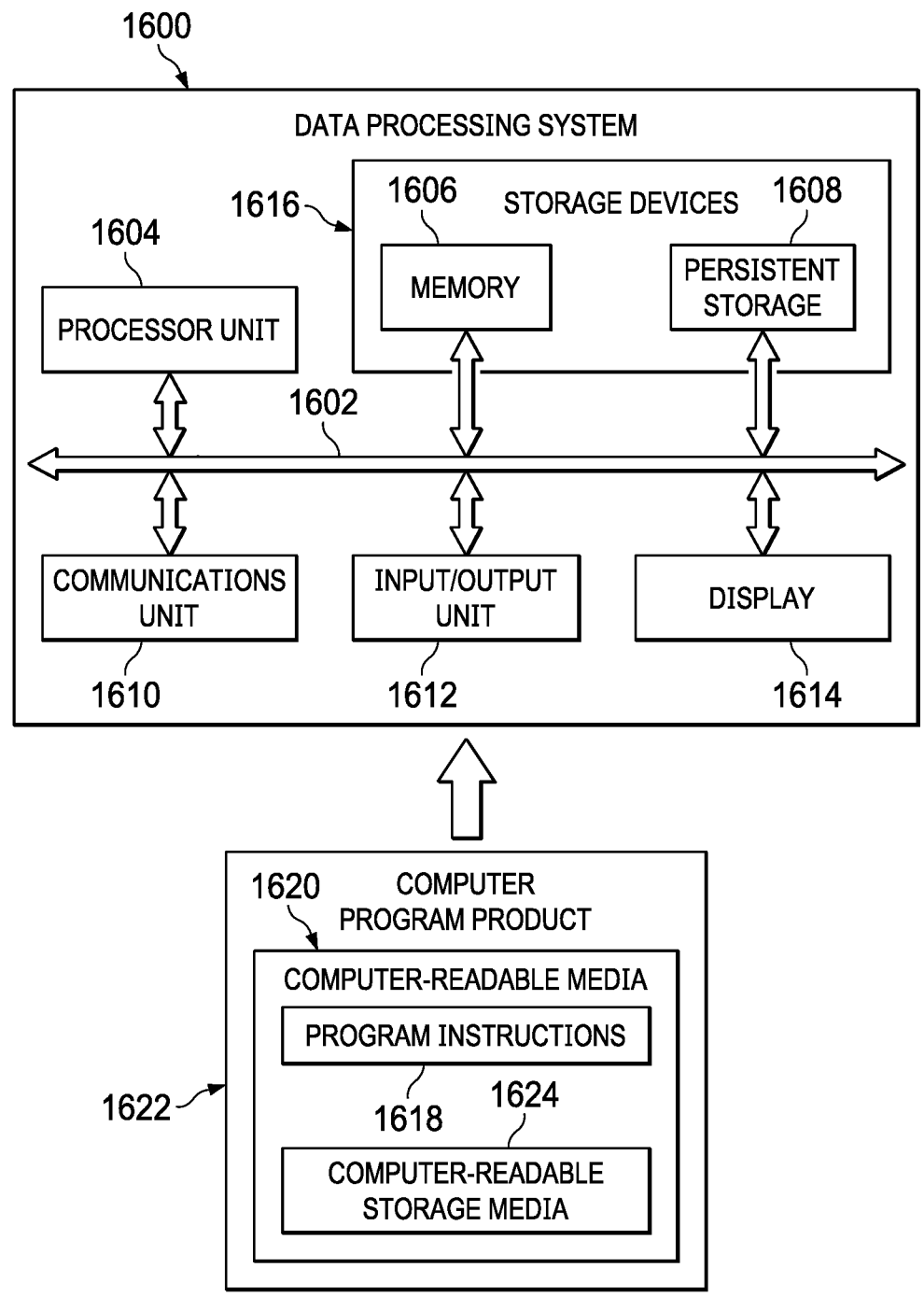
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement cloud computing nodes 110 in FIG. 1, personal digital assistant (PDA) or smart phone 120A, desktop computer 120B, laptop computer 120C, and/or automobile computer system 120N in FIG. 1. Data processing system 1600 can be used to implement computers in hardware and software layer 202 in FIG. 2 as well as server computer 304, server computer 306, and client devices 310 in FIG. 3. Data processing system 1600 can also be used to implement computer system 404 in FIG. 4. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer-readable program instructions that can be read and executed by a processor in processor unit 1604. The program instructions in the different embodiments can be embodied on different physical or computer-readable storage media, such as memory 1606 or persistent storage 1608.

Program instructions 1618 is located in a functional form on computer-readable media 1620 that is selectively removable and can be loaded onto or transferred to data processing system 1600 for execution by processor unit 1604. Program instructions 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program instructions 1618 rather than a medium that propagates or transmits program instructions 1618. Computer readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1618 can be transferred to data processing system 1600 using a computer-readable signal media. The computer-readable signal media are signals and can be, for example, a propagated data signal containing program instructions 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program instructions 1618 can be located in computer-readable media 1620 in the form of a single storage device or system. In another example, program instructions 1618 can be located in computer-readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer-readable media 1620 in a server computer while another portion of program instructions 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Thus, illustrative embodiments of the present invention provide a computer implemented method, computer system, and computer program product for managing virtual disks. In one illustrative example, a number of processor units detects attachment of a storage to a host operating system. The number of processor units mounts the storage to a set of mount points. The number of processor units creates a set of virtual disks and assigning, by the number of processor units, the set of virtual disks to a guest in operation in which instructions for the operation are performed without interruption. As a result, the use of an operation in which instructions are performed without interruption, such as an atomic operation, can reduce the possibility that a virtual disk can be attached to another guest operating system instead of the designated operating system. In the illustrative example, this risk can be reduced because the creation and attachment of the virtual disk is performed without interruption by processes that may attach the disc to a different guest before the virtual disk is attached to the intended guest.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing virtual disks, the computer implemented method comprising:
    detecting, by a number of processor units, attachment of storage to a host operating system;
    mounting, by the number of processor units, the storage to a set of mount points;
    creating, by the number of processor units, a set of virtual disks and assigning, by the number of processor units, the set of virtual disks to a guest in an operation in which instructions for the operation are performed without interruption;
    attaching, by a hypervisor for the guest, the set of virtual disks to the guest;
    creating, by the number of processor units, a set of partitions for the set of virtual disks prior to mounting the storage; and
    creating, by the number of processor units, a set of file systems in the set of partitions for the set of virtual disks prior to mounting the storage, wherein the storage is a physical storage device; and wherein mounting, by the number of processor units, the storage to the set of mount points comprises: mounting, by the number of processor units, the set of file systems in the set of partitions to the set of mount points.

2. The computer implemented method of claim 1, wherein the operation to create and assign the set of virtual disks to the guest is an atomic operation and wherein creating, by the number of processor units, the set of virtual disks and assigning, by the number of processor units, the set of virtual disks to the guest in the operation which instructions for the operation are performed without interruption comprises:
    creating, by the number of processor units, a set of virtual disk image files in the storage, wherein the set of virtual disk image files is for the set of virtual disks; and
    updating, by the number of processor units, a guest configuration for the hypervisor for the guest, wherein the hypervisor attaches the set of virtual disks to the guest using the guest configuration.

3. The computer implemented method of claim 1 further comprising:
    detecting, by the number of processor units, a resizing of the storage by examining a list of block storage devices received from the host operating system;
    updating, by the number of processor units, a guest configuration for the guest to reflect the resizing of the set of virtual disks, wherein the guest configuration for the guest describes virtual hardware resources for the guest including a set of virtual image files for the set of virtual disks; and
    notifying, by the number of processor units, the hypervisor of the guest configuration file update.

4. The computer implemented method of claim 1, further comprising:
  detecting, by the number of processor units, a resizing of the storage in which the resizing adds a storage device to the storage by examining a list of block storage devices received from the host operating system; and
  creating, by the number of processor units, a new set of virtual disks for the storage device and assigning, by the number of processor units, the new set of virtual disks to the guest in a new atomic operation in which the instructions for the new atomic operation are performed without interruption.

5. The computer implemented method of claim 1, further comprising:
  detecting, by the number of processor units, a resizing of the storage in which the resizing removes a storage device from the storage by examining a list of block storage devices received from the host operating system;
  removing, by the number of processor units, a number of virtual disks having a number of virtual disk image files located in the storage device; and
  unmounting, by the number of processor units, a set of partitions for the storage by sending a message to the host operating system.

6. The computer implemented method of claim 1 further comprising:
  detecting, by the number of processor units, a detachment of the storage by examining a list of block storage devices received from the host operating system;
  updating, by the number of processor units, a guest configuration for the guest to remove the set of virtual disks in response to detecting the detachment of the storage; and
  unmounting, by the number of processor units, the storage from the set of mount points by sending a message to the host operating system.

7. The computer implemented method of claim 1, wherein the guest is selected from a group comprising an operating system, a guest operating system, and a virtual machine.

8. A computer system comprising:
  a number of processor units, wherein the number of processor units executes program instructions to:
    detect attachment of a storage to a host operating system;
    mount the storage to a set of mount points;
    create a set of virtual disks and assigning, by the number of processor units, the set of virtual disks to a guest in an operation in which instructions for the operation are performed without interruption;
    attach the set of virtual disks to the guest by a hypervisor for the guest;
    create a set of partitions for the set of virtual disks prior to mounting the storage; and
    create a set of file systems in the set of partitions for the set of virtual disks prior to mounting the storage, wherein the storage is a physical storage device; and wherein in mounting, by the number of processor units, the storage to the set of mount points, the number of process units executes the program instructions to: mount the set of file systems in the set of partitions to the set of mount point.

9. The computer system of claim 8, wherein the operation to create and assign the set of virtual disks to the guest is an atomic operation and wherein in creating, by the number of processor units, the set of virtual disks and assigning the set of virtual disks to the guest in the operation which instructions for the operation are performed without interruption, the number of processor units executes the program instructions to:
  create a set of virtual disk image files in the storage, wherein the set of virtual disk image files is for the set of virtual disks; and
  update a guest configuration for the hypervisor for the guest, wherein the hypervisor attaches the set of virtual disks to the guest using the guest configuration.

10. The computer system of claim 8, wherein the number of processor units executes the program instructions to:
  detect a resizing of the storage by examining a list of block storage devices received from the host operating system;
  update a guest configuration for the guest to reflect the resizing of the set of virtual disks, wherein the guest configuration for the guest describes virtual hardware resources for the guest including a set of virtual image files for the set of virtual disks; and
  notify the hypervisor of the guest configuration file update.

11. The computer system of claim 8, wherein the number of processor units executes the program instructions to:
  detect a resizing of the storage in which the resizing adds a storage device to the storage by examining a list of block storage devices received from the host operating system; and
  create a new set of virtual disks for the storage device and assign the new set of virtual disks to the guest in a new atomic operation in which the instructions for the new atomic operation are performed without interruption.

12. The computer system of claim 8, wherein the number of processor units executes the program instructions to:
  detect a resizing of the storage in which the resizing removes a storage device from the storage by examining a list of block storage devices received from the host operating system;
  remove a number of virtual disks having a number of virtual disk image files located in the storage device; and
  unmount a set of partitions for the storage by sending a message to the host operating system.

13. The computer system of claim 8, wherein the number of processor units executes the program instructions to:
  detect a detachment of the storage by examining a list of block storage devices received from the host operating system;
  update a guest configuration for the guest to remove the set of virtual disks in response to detecting the detachment of the storage; and
  unmount the storage from the set of mount points by sending a message to the host operating system.

14. The computer system of claim 8, wherein the guest is selected from a group comprising an operating system, a guest operating system, and a virtual machine.

15. A computer program product for managing virtual disks, the computer program product comprising a computer readable storage medium having program instructions embodied therewith, the program instructions executable by a computer system to cause the computer system to perform a method of:
  detecting, by a number of processor units, attachment of a storage to a host operating system;
  mounting, by the number of processor units, the storage to a set of mount points;
  creating, by the number of processor units, a set of virtual disks and assigning, by the number of processor units, the set of virtual disks to a guest in an atomic operation in which instructions for the atomic operation are performed without interruption;
  attaching, by a hypervisor for the guest, the set of virtual disks to the guest;

creating, by the number of processor units, a set of partitions for the set of virtual disks prior to mounting the storage; and creating, by the number of processor units, a set of file systems in the set of partitions for the set of virtual disks prior to mounting the storage, wherein the storage is a physical storage device; and wherein mounting, by the number of processor units, the storage to the set of mount points comprises: mounting, by the number of processor units, the set of file systems in the set of partitions to the set of mount points.

16. The computer program product of claim 15, wherein a set of virtual disk image files is for the set of virtual disks and is located in the set of file systems, wherein the operation is an atomic operation and wherein creating, by the number of processor units, the set of virtual disks and assigning, by the number of processor units, the set of virtual disks to the guest in the operation which instructions for the operation are performed without interruption comprises:

creating, by the number of processor units, the set of virtual disk image files in the storage, wherein the set of virtual disk image files is for the set of virtual disks; and updating, by the number of processor units, a guest configuration for the hypervisor for the guest, wherein the hypervisor attaches the set of virtual disks to the guest using the guest configuration.

\* \* \* \* \*